Oct. 25, 1960 — J. R. WATERS — 2,957,296
HARVESTER REEL SUPPORT
Filed Dec. 19, 1958 — 2 Sheets-Sheet 2
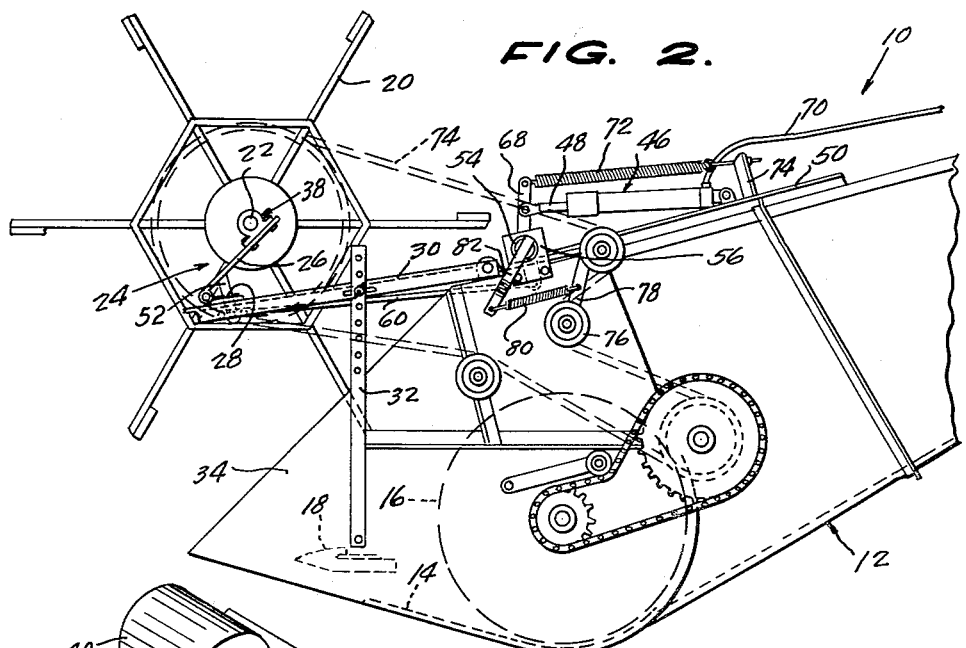
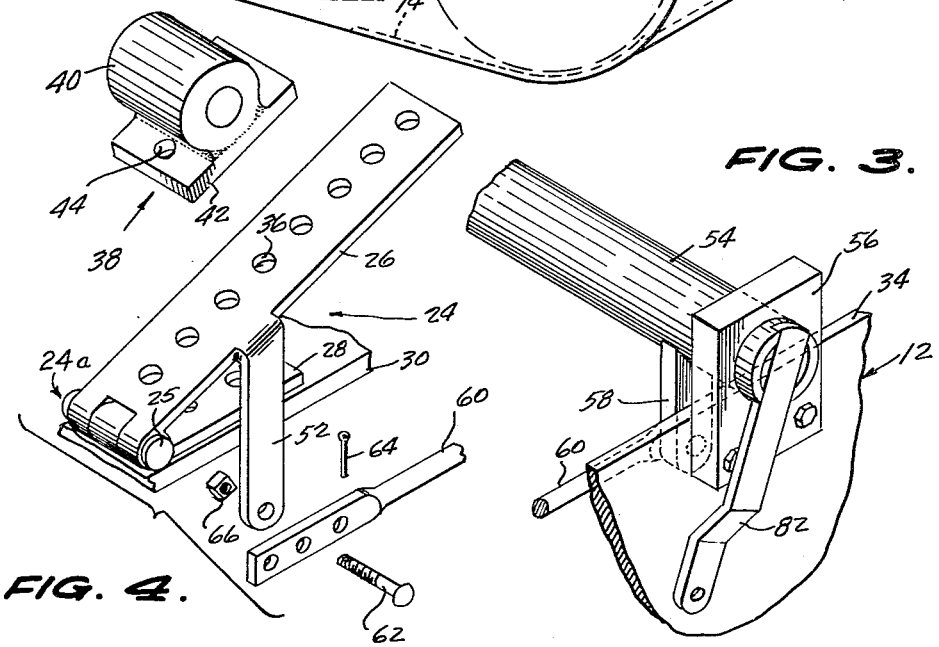
INVENTOR.
JAMES R. WATERS,
BY
McMorrow, Berman & Davidson
ATTORNEYS.

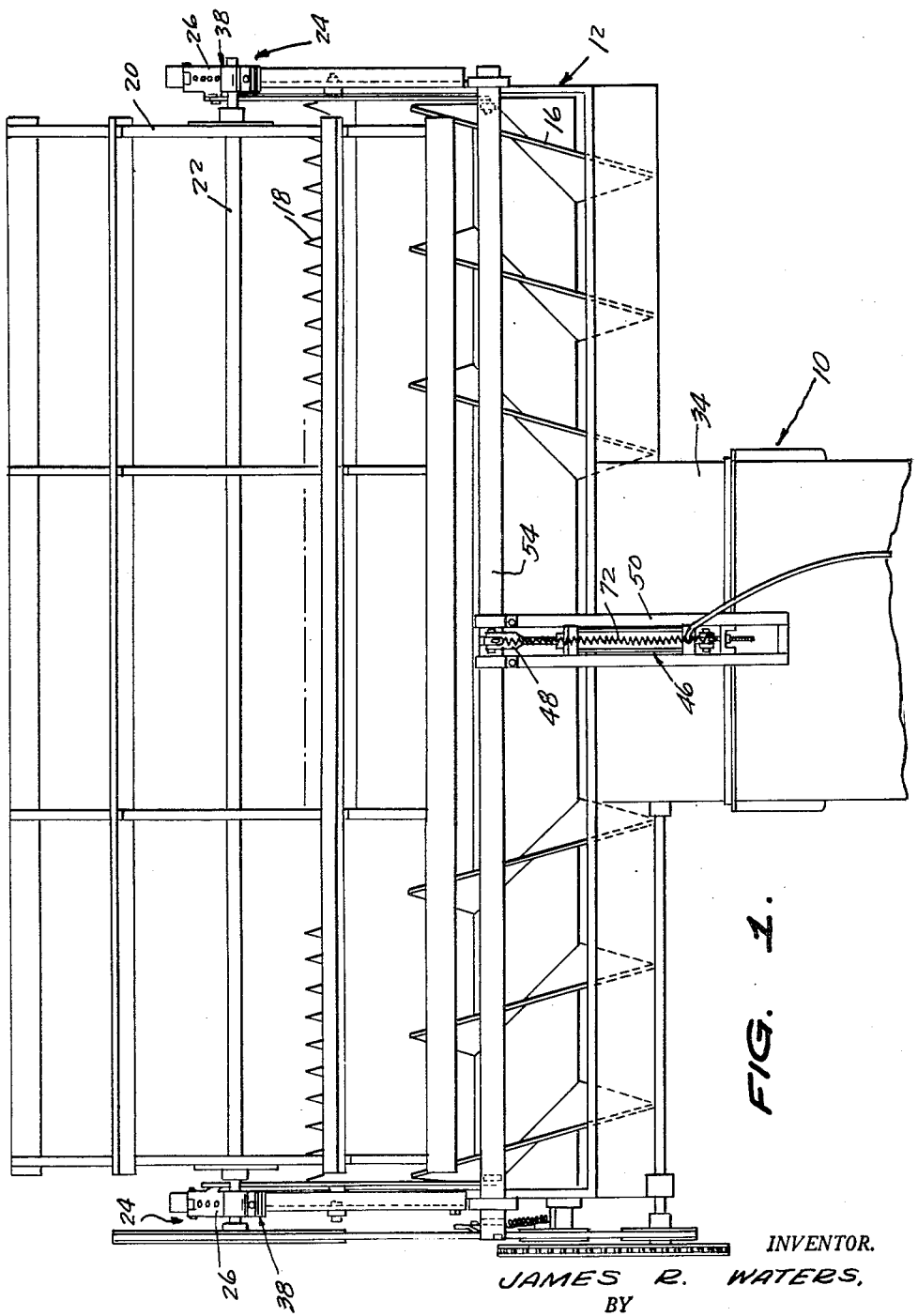

United States Patent Office 2,957,296
Patented Oct. 25, 1960

2,957,296

HARVESTER REEL SUPPORT

James R. Waters, Loma, Mont.

Filed Dec. 19, 1958, Ser. No. 781,534

6 Claims. (Cl. 56—220)

The present invention relates generally to harvesting machines and in particular to a support for the reel of a harvesting machine.

Presently in use are harvesting machines or combines having auger platforms and a rotatable reel mounted forwardly of and above the platform for directing the grain as it is cut to the auger platform. In the harvesting of certain grains, it is advantageous to shift the reel forwardly and upwardly so as to avoid unnecessary throw over of the cut grain. Many harvesters or combines in use have means for adjusting the position of the reel but such means frequently requires detachment of the reel from its support and reattachment of the reel at the adjusted position.

An object of the present invention is to provide an adjustable reel support for a harvester which is operable to shift the reel toward and away from the platform of the harvester by means controllable by the operator of the harvester without stopping of the harvester.

Another object of the present invention is to provide a reel support for a harvester or combine which enables the operator of the combine to adjust the position of the reel for cutting in light or heavy grain with ease and facility.

A further object of the present invention is to provide a reel support for a harvester or combine which is simple in structure, sturdily constructed, one adaptable for use on any harvester or combine, one which is economically feasible, and one which is highly effective in action.

These and other objects and advantages of the present invention will be fully apparent from the following description when taken in conjunction with the annexed drawings, in which:

Figure 1 is a plan view of the forward end of a harvester, showing the reel support of the present invention installed thereon;

Figure 2 is a side elevational view of the assembly shown in Figure 1;

Figure 3 is an enlarged isometric fragmentary view of one end of the actuating shaft employed with the reel support of the present invention for effecting the swinging movement of the latter; and Figure 4 is an enlarged isometric exploded view of the components of the reel support of the present invention at one end of the reel.

Referring in greater detail to the drawings in which like numerals indicate like parts throughout the several views, the reference numeral 10 designates generally a harvester having a frame structure 12, only the forward end of the harvester being illustrated. The frame structure 12 includes a platform 14 over which is rotatably mounted an auger 16 for directing cut grain to an elevating means, the latter not being shown as not being a part of the present invention. A cutter blade assembly 18 is positioned forwardly of the auger 16 and a rotatable reel 20 is mounted intermediate the ends of a shaft 22. The reel 20 is disposed above and forwardly of and in spaced relation with respect to the platform 14 with the shaft 22 horizontally disposed and transversely of and spaced forwardly of the platform 14. The present invention comprises an improvement consisting of a reel support 24 for mounting the shaft 22 of the reel 20 on the frame structure 12.

The reel support 24 comprises an elongated support member 26, embodying one leaf of a hinge 24a arranged in an upwardly and rearwardly sloping direction and extending longitudinally of the platform 14 adjacent each end of the shaft 22. The other leaf 28 of each of the hinges is in registry with and beneath and adjacent support member 26 and is horizontally disposed and rigidly secured to the free end of an arm 30 which projects forwardly from the frame structure 12 on each side of the latter exteriorly of the ends of the reel 20. The arms 30 are connected to each side of the frame structure 12 by a vertically extending bar 32 mounted on each side of the frame structure 12. A hinge pin 25 connects each support member 26 to the adjacent hinge leaf 28 for rocking up and down movement of the support member 26 about the pin 25 as a horizontal axis.

Each support member 26 is provided with a plurality of holes 36 arranged in spaced relation therealong. The support member 26 shown in Figure 4 is the portion of the reel support 24 for the left hand end of the reel as viewed in Figure 1, it being understood that the support member 26 at the right hand end of the reel is oppositely formed but not here illustrated for reasons of simplification.

The bearing means 38 is carried by each of the support members 26 adjacent the upper end thereof, each bearing means 38 comprising a horizontally disposed sleeve 40 mounted upon a plate 42, each sleeve 40 receivingly engaging the adjacent portion of the reel shaft 22. Bolts (not shown) are employed to secure the plates 42 to the support member 26 in any desired adjusted position along the support member 26, the plate 42 being provided with a hole 44 on each side of the sleeves 40 for the reception therein of suitable bolts also extending through selected holes 36 of the support member 26.

The hinge connection of each support member 26 to the adjacent arm 30 permits swinging movement of the support member 26 about a horizontal axis toward and away from the harvester platform 14.

Means is provided operatively connecting the support members to the frame structure 12 for effecting their simultaneous swinging movement toward and away from the platform 14 for the purpose of adjusting the position of the reel 20 relative to the platform 14. Specifically, this means includes a hydraulic cylinder assembly 46 having an actuating arm 48 movable between extended and retracted position. One end of the cylinder of the hydraulic cylinder assembly 46 is pivotally connected to the frame structure 12 by means of a rigid plate member 50 resting upon and secured to the overhanging portion of the housing 34 intermediate the ends of the latter.

An arm 52 projects downwardly from each support member 26 intermediate the ends of the latter and has its free end spaced below the support member 26. An actuating shaft 54 is horizontally disposed and positioned above and spaced from the platform 14 rearwardly of and parallel to the reel shaft 22. The actuating shaft 54 has its ends mounted in bearing blocks 56 fixedly secured to the upper edge of the housing 34, as shown in Figure 3 with reference to the left hand end of the actuating shaft 54.

An arm 58 projects downwardly from the portion of the actuating shaft 54 inwardly of and adjacent each end thereof, the free end of each arm 58 being spaced below the actuating shaft 54.

A rigid connection element 60, in the form of a bar, connects the free end of each arm 52 with the free end of the adjacent arm 58 for effecting the swinging movement of the support members 26 responsive to rotational movement of the actuating shaft 54 in clockwise and counterclockwise directions.

One end of each connection element 60 is pivotally connected to the arm 58 by conventional means such as a bolt or rivet and the other end is adjustably connected by a bolt and nut assembly 62 to the free end of the adjacent reel support member arm 52. A cotter pin 64 (Figure 4) or other conventional means, may be inserted through a hole provided in the bolt of the bolt and nut assembly 62 for keeping the nut 66 of the bolt and nut assembly 62 on the bolt and to prevent its inadvertent loss therefrom.

An arm 68 projects upwardly from the midpart of the actuating shaft 54 and the free end of the hydraulic cylinder actuating arm 48 is pivotally connected to the arm 68 intermediate the ends thereof. A conventionally constructed hydraulic fluid conduit 70 connects the interior of the cylinder of the hydraulic cylinder assembly 46 to a source of hydraulic fluid under pressure on the harvester 10 with a suitable control valve, not shown, in such conduit 70 accessible to the operator of the harvester 10.

A coil spring 72 has one end connected to the free end of the arm 68 and the other end connected to a plate member 74 projecting upwardly from the plate 50. The spring 72 biases the actuating arm 48 of the hydraulic cylinder assembly 46 to the retractive position.

Conventional drive means, including a belt 74, is employed to rotate the reel 20 and the belt 74 is kept under tension in all positions of swinging movement of the support members 26 by means of an idler pulley 76 mounted on the lower end of an upwardly sloping arm 78. The upper end of the arm 78 is pivotally connected to the housing 34 and a coil spring 80 has one end connected to an intermediate portion of the arm 78 and the other end connected to the free end of a bar 82 which is secured at its other end to the one end of the actuating shaft 54, as shown most clearly in Figure 3.

The spring 80 provides tension to the belt 74 in all positions of the adjusted movement of the support members 26 forwardly and rearwardly or toward and away from the platform 14.

In operation, the operator of the combine or harvester 10 may control the extension and retraction of the hydraulic cylinder actuating arm 48 by admitting hydraulic fluid under pressure into the cylinder of the assembly 46 and by permitting the fluid to flow therefrom. Extension of the actuating arm 48 results in rotation of the actuating shaft 54 in the counterclockwise direction which exerts a pulling force upon the connection element 60 to swing upwardly the support members 26 simultaneously to carry the reel shaft 22 upwardly and away from the platform 14. Retraction of the actuating arm 48 under the action of the spring 72 when fluid is permitted to flow from the cylinder of the assembly 46 results in movement of the reel shaft 22 toward the platform 14 and downwardly in an arcuate movement about the point of connection of the support members 26 to their hinge leaves 28 as an axis.

What is claimed is:

1. In a harvester including a frame structure, a platform supported on said frame structure, a horizontally disposed shaft positioned transversely of said platform and spaced from said platform, and a reel carried by said shaft intermediate the ends thereof, the improvement consisting of an elongated support member positioned adjacent each end of said shaft so as to extend longitudinally of said platform and in an upwardly and rearwardly sloping direction with respect to said platform, a bearing element secured to each of said support members and receiving the adjacent end of said shaft, and means connecting each of said support members to said frame structure for rocking movement upwardly and downwardly about a horizontal axis.

2. In a harvester including a frame structure, a platform supported on said frame structure, a horizontally disposed shaft positioned transversely of said platform and spaced from said platform, and a reel carried by said shaft intermediate the ends thereof, the improvement consisting of an elongated support member positioned adjacent each end of said shaft so as to extend longitudinally of said platform and in an upwardly and rearwardly sloping direction with respect to said platform, a bearing element shiftable along and selectively secured to each of said support members and receiving the adjacent end of said shaft, and means connecting each of said support members to said frame structure for rocking movement upwardly and downwardly about a horizontal axis.

3. In a harvester including a frame structure, a platform supported on said frame structure, a horizontally disposed shaft positioned transversely of said platform and spaced from said platform, and a reel carried by said shaft intermediate the ends thereof, the improvement consisting of an elongated support member positioned adjacent each end of said shaft so as to extend longitudinally of said platform and in an upwardly and rearwardly sloping direction with respect to said platform, a bearing element secured to each of said support members and receiving the adjacent end of said shaft, a horizontally disposed leaf positioned beneath and in registry with each of said support members and rigidly secured to said frame structure, and means connecting each of said support members to the adjacent leaf for rocking up and down movement of said support member about a horizontal axis.

4. In a harvester including a frame structure, a platform supported on said frame structure, a horizontally disposed shaft positioned transversely of said platform and spaced from said platform, and a reel carried by said shaft intermediate the ends thereof, the improvement consisting of an elongated support member positioned adjacent each end of said shaft so as to extend longitudinally of said platform and in an upwardly and rearwardly sloping direction with respect to said platform, a bearing element secured to each of said support members and receiving the adjacent end of said shaft, a horizontally disposed leaf positioned beneath and in registry with each of said support members and rigidly secured to said frame structure, means connecting each of said support members to the adjacent leaf for rocking up and down movement of said support member about a horizontal axis, and means operatively connected to said support members for effecting their simultaneous movement.

5. In a harvester including a frame structure, a platform supported on said frame structure, a horizontally disposed shaft positioned transversely of said platform and spaced from said platform, and a reel carried by said shaft intermediate the ends thereof, the improvement consisting of an elongated support member positioned adjacent each end of said shaft so as to extend longitudinally of said platform and in an upwardly and rearwardly sloping direction with respect to said platform, a bearing element secured to each of said support members and receiving the adjacent end of said shaft, a horizontally disposed leaf positioned beneath and in registry with each of said support members and rigidly secured to said frame structure, means connecting each of said support members to the adjacent leaf for rocking up and down movement of said support member about a horizontal axis, and means including a hydraulic cylinder assembly operatively connected to said support members for effecting their simultaneous movement.

6. In a harvester including a frame structure, a platform supported on said frame structure, a horizontally disposed shaft positioned transversely of said platform and spaced from said platform, and a reel carried by said shaft intermediate the ends thereof, the improvement consisting of an elongated support member positioned adjacent each end of said shaft so as to extend longitudinally of said platform and in an upwardly and rearwardly sloping direction with respect to said platform, a bearing element secured to each of said support members and receiving the adjacent end of said shaft, a horizontally disposed leaf positioned beneath and in registry with each of said support members and rigidly secured to said frame structure, means connecting each of said support members to the adjacent leaf for rocking up and down movement of said support member about a horizontal axis toward and away from said platform, and spring means operatively connected to said support members urging the latter toward said platform.

References Cited in the file of this patent

UNITED STATES PATENTS

| 2,024,735 | Hume et al. | Dec. 17, 1935 |
| 2,822,656 | Rogers | Feb. 11, 1958 |

FOREIGN PATENTS

| 1,132,053 | France | Oct. 29, 1956 |